J. B. Francis,
Journal Bearing.
N° 39,562. Patented Aug. 18, 1863.
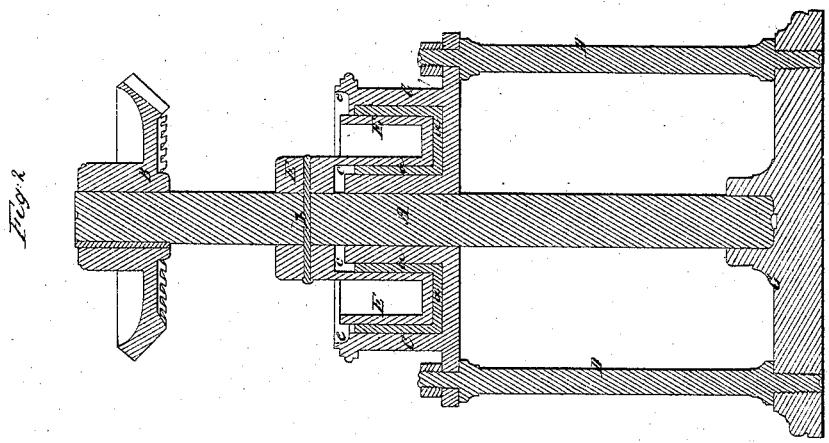
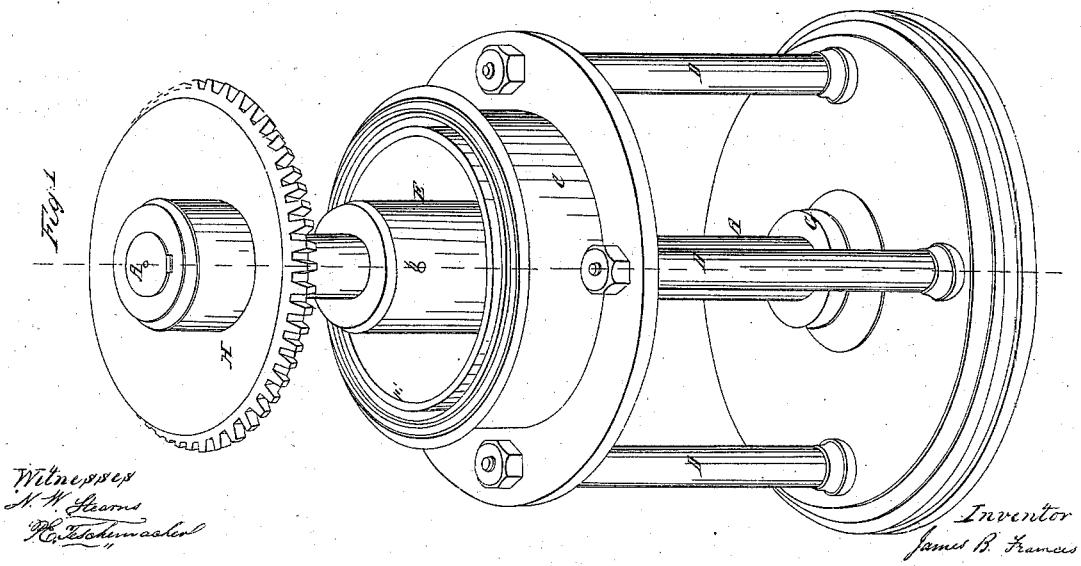

UNITED STATES PATENT OFFICE.

JAMES B. FRANCIS, OF LOWELL, MASSACHUSETTS.

IMPROVEMENT IN SHAFT-BEARINGS.

Specification forming part of Letters Patent No. 39,562, dated August 18, 1863.

*To all whom it may concern:*

Be it known that I, JAMES B. FRANCIS, of Lowell, in the county of Middlesex and State of Massachusetts, have invented a mercurial floating bearing for upright shafts of water-wheels, mills, and other machinery; and I hereby declare the following to be a full and exact description of the same, refererence being had to the accompanying drawings, making a part of this specification, in which—

Figure 1 is a perspective view of an upright shaft of a water-wheel having my improved bearing attached. Fig. 2 is a central vertical section through the same.

In erecting vertical shafts of water-wheels, mills, &c., a serious difficulty has been experienced on account of the friction on the step or other solid bearing-surfaces resulting from the excessive weight upon such bearing-surfaces and the velocity with which one surface runs on the other. If these bearing-surfaces are under water, they are liable to be worn away rapidly and cause serious derangements of the machinery, and if out of water the solid substances of the bearing are liable to be injured by heating, even with the free application of the best and most costly lubricants. There is also a considerable amount of power consumed in the friction of such bearings.

My invention has for its object the removal or diminution of these difficulties; and it consists in the employment of mercury as a bearing, which is accomplished by placing a quantity of this fluid in a suitable receptacle and causing a drum or circular float which is attached to the shaft and revolves with it to be partially or wholly immersed in the mercury. This drum or float is of less weight than the volume of mercury it displaces, and the step or other solid bearing is relieved of a weight or pressure upon it equal to the difference between the weight of the drum or float and the volume of mercury it displaces. This difference may be greater or less, as may be found convenient or desirable.

To enable others skilled in the art to understand and use my invention, I will proceed to describe the manner in which I have carried it out.

In the accompanying drawings, A is the shaft of a water-wheel, the lower end of which runs in a step, G, and to the upper extremity is secured a bevel-wheel, B, by which the power is transmitted to the working machinery.

C is a hollow box or receptable of iron or other suitable material of the form shown in the drawings, which is supported by the frame-work D. In this receptacle C is placed a suitable quantity of mercury, $a$.

E is a drum or float, also of iron or other suitable material, attached to the shaft A by a pin, $b$, or otherwise, and its center is hollowed out, leaving a space, $c$. This drum or float revolves freely in the mercury contained in the receptacle C, and in order that it may revolve with the least expenditure of power the surfaces of the receptacle and drum or float in contact with the mercury should be made smooth, and those of the drum or float should be accurate surfaces of revolution concentric with the axis of the shaft. The top of the receptacle C is enlarged, forming a space, $e$, to receive any excess of mercury and prevent its overflow and loss. The space above the mercury in the receptacle C, I partially fill with water, oil, glycerine, or other suitable fluid, in order to prevent waste of the mercury from agitation or other causes. It will usually be found most convenient to support only a portion of the weight of the shaft and apparatus attached thereto by means of the mercurial floating bearing, leaving the remainder to be sustained by a solid step or other bearing.

In practice I have found it to answer well to support about one-half of the weight by the mercurial floating bearing, but it is evident that this may be varied according to circumstances. If the whole weight were supported by the mercurial floating bearing, the shaft would be liable to vibrate vertically, which in most cases would be impracticable.

I have described the mercurial floating bearing as applied to the shaft A at only one point, as shown in the drawings, but it is obvious that it may be applied at the top or bottom of the shaft, or at both, or at one or more intermediate points, and where several upright shafts are connected together it may be attached to one or more of them. If the mercurial floating bearing were placed at the bottom of the shaft, it would be found convenient to arrange it in a form somewhat different from that I have described, and when applied at any point of the shaft it may be constructed in various forms.

What I claim as my invention, and desire to secure by Letters Patent, is—

The employment of mercury as a bearing for upright shafts, substantially in the manner as set forth.

JAMES B. FRANCIS.

Witnesses:
 N. W. STEARNS,
 P. E. TESCHEMACHER.